US009274726B2

(12) United States Patent
Ito (10) Patent No.: US 9,274,726 B2
(45) Date of Patent: Mar. 1, 2016

(54) COMMUNICATION APPARATUS CAPABLE OF NOTIFYING TEMPORARY DISCONNECTION FROM NETWORK, COMMUNICATION SYSTEM, METHOD OF CONTROLLING COMMUNICATION APPARATUS, AND STORAGE MEDIUM (71) Applicant: CANON KABUSHIKI KAISHA, Tokyo (JP)

(72) Inventor: Yuki Ito, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/541,512

(22) Filed: Nov. 14, 2014

(65) Prior Publication Data
US 2015/0153978 A1    Jun. 4, 2015

(30) Foreign Application Priority Data
Nov. 29, 2013 (JP) ................................. 2013-247635

(51) Int. Cl.
*G06F 3/12*      (2006.01)
*H04W 76/00*    (2009.01)

(52) U.S. Cl.
CPC ............ *G06F 3/1236* (2013.01); *G06F 3/1207* (2013.01); *G06F 3/1229* (2013.01); *G06F 3/1259* (2013.01); *G06F 3/1288* (2013.01); *G06F 3/1292* (2013.01); *H04W 76/00* (2013.01)

(58) Field of Classification Search
CPC ..... H04W 84/12; G06F 3/1292; G06F 3/1236

USPC .......................... 358/1.15, 1.14; 370/254, 913
See application file for complete search history.

(56) References Cited

U.S. PATENT DOCUMENTS

| 2007/0130296 | A1* | 6/2007 | Kim | 709/220 |
|---|---|---|---|---|
| 2011/0177780 | A1* | 7/2011 | Sato et al. | 455/41.1 |
| 2013/0094047 | A1* | 4/2013 | Bailey et al. | 358/1.14 |
| 2014/0269507 | A1* | 9/2014 | Tanji | H04W 76/043 370/328 |
| 2014/0273850 | A1* | 9/2014 | Park et al. | 455/41.2 |

FOREIGN PATENT DOCUMENTS

JP    07-141261 A    6/1995

* cited by examiner

*Primary Examiner* — Jacky X Zheng
(74) *Attorney, Agent, or Firm* — Rossi, Kimms & McDowell LLP

(57) ABSTRACT

A printing system capable of distinguishing between disconnection of a communication apparatus from a network caused by power-off of the communication apparatus and temporary disconnection of the communication apparatus from the network caused by a change in an operation mode of the communication apparatus. A printing system includes a printing apparatus and a print server. When the printing apparatus has shifted from a first communication mode for performing wireless communication between the printing apparatus and the mobile terminal to a second communication mode for communicating with the print server, the printing apparatus notifies the print server of predetermined information. When the predetermined information is received, the print server transmits a print job spooled therein to the printing apparatus.

12 Claims, 8 Drawing Sheets

COMMUNICATION APPARATUS CAPABLE OF NOTIFYING TEMPORARY DISCONNECTION FROM NETWORK, COMMUNICATION SYSTEM, METHOD OF CONTROLLING COMMUNICATION APPARATUS, AND STORAGE MEDIUM

BACKGROUND OF THE INVENTION

1. Field of the Invention

The present invention relates to a communication apparatus capable of notifying temporary disconnection from a network, a communication system, a method of controlling the communication apparatus, and a storage medium.

2. Description of the Related Art

In recent years, as a printing apparatus, such as a printer or a multifunction peripheral (MFP), there has been widely used one which has a wireless LAN function. The printing apparatus equipped with such a wireless LAN function is connected to an access point, as a client, and communicates with a personal computer (PC), a mobile terminal, and the like, via the access point.

The printing apparatus connected to the wireless LAN can notify other apparatuses, such as various types of servers which are connected to the wireless LAN of a state of the printing apparatus, whereby the servers can manage the printing apparatus. For example, Japanese Patent Laid-Open Publication No. H07-141261 discloses a technique in which when a predetermined communication apparatus connected to a network is powered off, information on the power-off is notified to a network monitoring apparatus.

On the other hand, in order to directly communicably connect a plurality of communication apparatuses, the standard of Wi-Fi Direct (registered trademark) is established by Wi-Fi Alliance. The Wi-Fi Direct defines a protocol for determining which role, an access point or a client, is to be assigned to each of communication apparatuses including printing apparatuses and PCs. By performing this protocol, it is possible to automatically determine a communication apparatus which is to be operated as the access point and a communication apparatus which is to be operated as the client. That is, by using the Wi-Fi Direct, it is unnecessary to provide an access point separately, and the communication apparatuses can directly communicate with each other.

Now, the outline of a processing sequence of the Wi-Fi Direct will be described hereafter. Here, a printing apparatus and a mobile terminal are taken as examples of the communication apparatuses, and it is assumed that both of them support the Wi-Fi Direct.

First, the printing apparatus and the mobile terminal mutually search for communication partners, and identify their communication partners. After identifying the communication partners, the printing apparatus and the mobile terminal determine which of them is to play the role of the access point (Group Owner) and which of them is to play the role of the client (Client). Here, it is assumed that the printing apparatus is determined to be the access point and the mobile terminal is determined to be the client.

Next, parameters for connecting the printing apparatus as the access point to the mobile terminal as the client are provided by using WPS (Wi-Fi Protected Setup) established by Wi-Fi Alliance. This processing causes the parameters to be shared between the printing apparatus and the mobile terminal, and the printing apparatus and the mobile terminal establish secure connection using the shared parameters.

When the secure connection has been completed, the printing apparatus and the mobile terminal perform addressing (IP connection) for performing IP communication. The printing apparatus (access point) operates as a DHCP server, and gives an IP address to the mobile terminal (client). By performing the above-described processing sequence, the printing apparatus and the mobile terminal can directly perform wireless communication using the Wi-Fi Direct without an access point separately provided.

An infrastructure mode in which the printing apparatus is communicably connected to the wireless LAN via the access point, and a Wi-Fi Direct mode in which the printing apparatus is communicably connected to another communication apparatus using the Wi-Fi Direct are normally operate in a mutually exclusive manner. Therefore, when the Wi-Fi Direct mode is set to the printing apparatus in the infrastructure mode, the connection of the printing apparatus to the wireless LAN is terminated, whereby it is impossible for another apparatus connected to the wireless LAN to communicate with the printing apparatus.

In the technique disclosed in Japanese Patent Laid-Open Publication No. H07-141261, the predetermined communication apparatus sends only a power-off notification. Therefore, when the predetermined communication apparatus shifts from the infrastructure mode to the Wi-Fi Direct mode to temporarily terminate the infrastructure mode, the predetermined communication apparatus cannot send an appropriate notification to the other apparatus connected to the wireless LAN.

For example, assuming that when the printing apparatus as an example of the predetermined communication apparatus shifts from the infrastructure mode to the Wi-Fi Direct mode, the printing apparatus transmits the same notification as when the printing apparatus is powered off, to the print server as an example of the other apparatus connected to the wireless LAN. In this case, when a print job is sent from the print server to the printing apparatus, a transmission error occurs, and the print job is terminated by the error. Further, in a case where a power management server connected to the wireless LAN manages the amount of power consumption of the printing apparatus, the power management server stops calculating the integral power consumption of the printing apparatus although the printing apparatus is operating in the Wi-Fi Direct mode. This makes it impossible to perform accurate power management of the printing apparatus.

SUMMARY OF THE INVENTION

The present invention provides a technique capable of distinguishing between disconnection of a communication apparatus from a network caused by power-off of the communication apparatus and temporary disconnection of the communication apparatus from the network caused by a change in an operation mode of the communication apparatus.

In a first aspect of the present invention, there is provided a printing system that includes a printing apparatus and a print server, wherein the printing apparatus comprises a printing unit configured to perform print processing, a wireless communication unit configured to perform wireless communication between the printing apparatus and a mobile terminal, and a notification unit configured to notify the print server of predetermined information in a case where the printing apparatus has shifted from a first communication mode for performing the wireless communication between the printing apparatus and the mobile terminal to a second communication mode for communicating with the print server, and wherein the print server comprises a storing unit configured to store a print job, and a transmission unit configured to transmit the print job stored by the storing unit to the printing apparatus in a case where the print server has received the predetermined information notified by the notification unit.

In a second aspect of the present invention, there is provided a printing apparatus that is capable of communicating with a print server, comprising a wireless communication unit configured to perform wireless communication between the printing apparatus and a mobile terminal, a notification unit configured to notify the print server of predetermined information in a case where the printing apparatus has shifted from a first communication mode for performing the wireless communication between the printing apparatus and the mobile terminal to a second communication mode for communicating with the print server, a reception unit configured to, in a case where the notification unit has notified the print server of the predetermined information, receive a print job stored in the print server, from the print server, and a printing unit configured to perform print processing based on the print job.

In a third aspect of the present invention, there is provided a method of controlling a printing apparatus that is capable of communicating with a print server, comprising performing wireless communication between the printing apparatus and a mobile terminal, notifying the print server of predetermined information in a case where the printing apparatus has shifted from a first communication mode for performing the wireless communication between the printing apparatus and the mobile terminal to a second communication mode for communicating with the print server, receiving, in a case where said notifying notifies the print server of the predetermined information, a print job stored in the print server, from the print server, and performing print processing based on the print job.

In a fourth aspect of the present invention, there is provided a non-transitory computer-readable storage medium storing a computer-executable program for executing a method of controlling a printing apparatus that is capable of communicating with a print server, wherein the method comprises performing wireless communication between the printing apparatus and a mobile terminal, notifying the print server of predetermined information in a case where the printing apparatus has shifted from a first communication mode for performing the wireless communication between the printing apparatus and the mobile terminal to a second communication mode for communicating with the print server, receiving, in a case where said notifying notifies the print server of the predetermined information, a print job stored in the print server, from the print server, and performing print processing based on the print job.

According to the present invention, it is possible to distinguish between disconnection from the network caused by power-off of the communication apparatus and temporary disconnection from the network. This makes it possible for another apparatus connected to the network to properly perform communication with and management of the predetermined communication apparatus.

For example, while a printing apparatus as an example of the communication apparatus is shifting from an infrastructure mode to a Wi-Fi Direct mode, a print server as an example of the other apparatus can spool a print job to the printing apparatus. This makes it possible to prevent a print job error from occurring in a terminal which has given a print instruction, and makes it unnecessary to instruct the printing apparatus to execute the print job again. Further, the power management server as an example of the other apparatus can perform accurate power management since it can continue to calculate the integral power consumption of the printing apparatus.

Further features of the present invention will become apparent from the following description of exemplary embodiments (with reference to the attached drawings).

DESCRIPTION OF THE EMBODIMENTS

Figure 1:
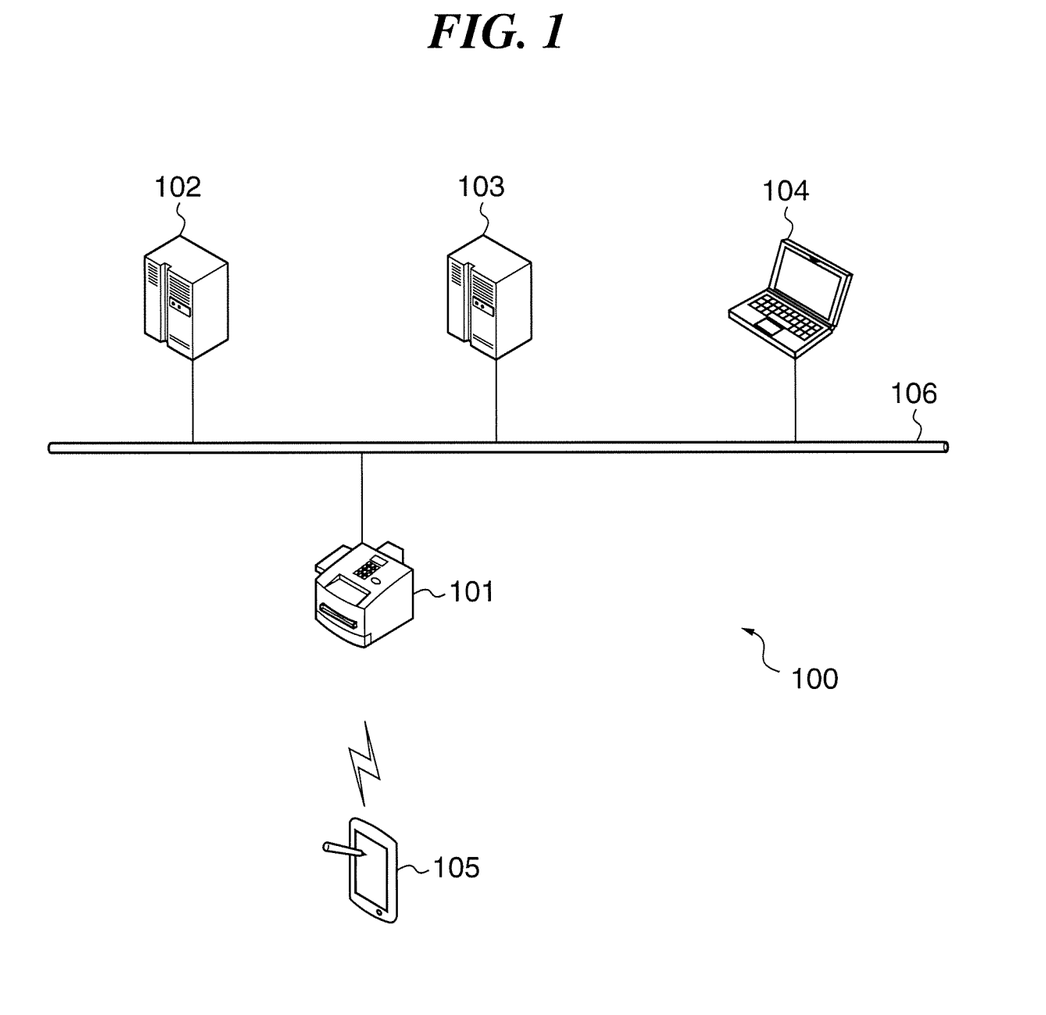
FIG. 1 is a schematic diagram of a communication system according to an embodiment of the present invention.

The present invention will now be described in detail below with reference to the accompanying drawings showing embodiments thereof. FIG. 1 is a schematic diagram of a communication system 100 according to an embodiment of the present invention.

The communication system 100 is comprised of a printing apparatus 101, which is one of communication apparatuses connected to each other by a wired LAN 106 (first network), a print server 102, a power management server 103, and a personal computer (hereinafter referred to as the "PC") 104. A mobile terminal 105 can be connected to the printing apparatus 101 via Wi-Fi Direct (second network). Note that examples of the mobile terminal 105 include a mobile communication terminal, such as a mobile phone and a smart phone, a mobile computer, such as a notebook PC and a tablet PC, a mobile game machine, a digital still camera, and a digital video camera.

Although in the present embodiment, the printing apparatus 101, the print server 102, the power management server 103, and the PC 104 are each singly connected to the wired LAN 106, the configuration may be such that each of these different types of apparatuses is connected in plurality. Further, the communication system 100 may be configured such that the apparatuses including the printing apparatus 101 are connected not by the wired LAN 106 but by a wireless network. When the wireless network is used, the printing apparatus 101 is communicably connected e.g. via an access point to the print server 102, the power management server 103, and the PC 104. Furthermore, the communication system 100 may be configured such that a single communication network is constructed by using a wireless router having a connection port of a LAN cable as the access point such that some of the apparatuses are connected to the wired LAN 106 and the remainder of the apparatuses are connected the wireless network.

In the following description, a state in which the printing apparatus 101 is communicably connected to the print server 102, the power management server 103, and the PC 104, via the wired LAN 106, will be referred to as the "infrastructure mode". Further, a state in which the printing apparatus 101 is communicably connected to the mobile terminal 105 via the Wi-Fi Direct will be referred to as the "direct mode". Note that since the printing apparatus 101 causes the infrastructure mode and the direct mode to operate in a mutually exclusive manner, it is impossible to simultaneously realize the connection via the wired LAN 106 and the connection via the Wi-Fi Direct.

Figure 2:
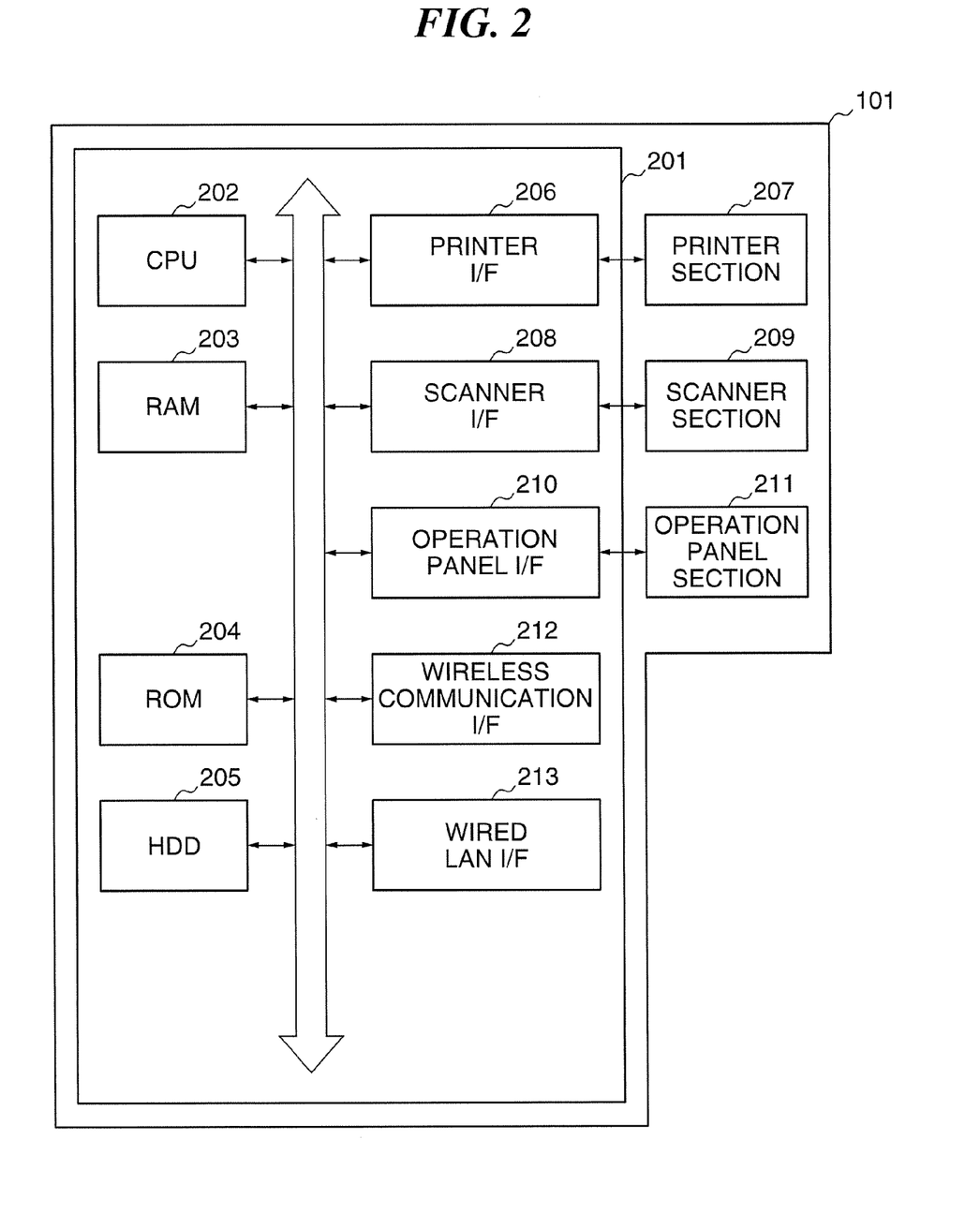
FIG. 2 is a block diagram of the hardware configuration of a printing apparatus included in the communication system shown in FIG. 1.

FIG. 2 is a block diagram of the hardware configuration of the printing apparatus 101. The following description will be given of the hardware configuration of the printing apparatus 101 as a single apparatus with reference to FIG. 2 without limiting the state thereof to the FIG. 1 state in which the printing apparatus 101 is connected to the wired LAN 106.

The printing apparatus 101 is comprised of a controller 201, a printer section 207, a scanner section 209, and a console panel section 211. Further, the controller 201 includes a CPU 202, a RAM 203, a ROM 204, an HDD 205, a printer interface 206, a scanner interface 208, a console panel interface 210, a wireless communication interface 212, and a wired LAN interface 213.

The controller 201 controls the overall operation of the printing apparatus 101. The CPU 202 reads out control programs stored in the ROM 204 and performs various controls including a communication control. The RAM 203 is used as temporary areas, such as a main memory and a work area, for the CPU 202. The HDD 205 stores data, various programs, and various information tables.

The printer interface 206 connects between the printer section (printer engine) 207 and the controller 201. The printer section 207 performs print processing on sheets fed from a sheet feed cassette (not shown) based on print data input via the printer interface 206. The scanner interface 208 connects between the scanner section 209 and the controller 201. The scanner section 209 reads an original placed on platen glass, not shown, and generates image data. The image data generated by the scanner section 209 is printed by the printer section 207, and is stored in the HDD 205, or is sent to an external apparatus via the wireless communication interface 212 or the wired LAN interface 213. The console panel interface 210 connects between the console panel section 211 and the controller 201, and transmits instructions input from various buttons (keys) (not shown) or a touch panel included in the console panel section 211 to the controller 201.

A LAN cable is connected to the wired LAN interface 213. In the case of the communication system 100, the wired LAN 106 is constructed via the LAN cable, which is connected to the wired LAN interface 213, such that the printing apparatus 101 can communicate with the print server 102, the power management server 103, and the PC 104.

The wireless communication interface 212 makes it possible to perform wireless communication between the printing apparatus 101 and an external apparatus connected to the printing apparatus 101 via a wireless LAN. The printing apparatus 101 receives print data from the external apparatus by this wireless communication, and the printer section 207 performs print processing based on the received print data. Further, image data generated by the scanner section 209 can be transmitted to the external apparatus via the wireless communication interface 212.

Further, the wireless communication interface 212 makes it possible to perform wireless communication between the printing apparatus 101 and an external apparatus via the Wi-Fi Direct. The wireless communication interface 212 performs communication control for switching between the connection between the printing apparatus 101 and the external apparatus via the wireless LAN and the connection therebetween via the Wi-Fi Direct in a mutually exclusive manner according to conditions.

Note that in the present embodiment, as described with reference to FIG. 1, it is assumed that the printing apparatus 101 is connected to the wired LAN 106 and hence a network via the wireless LAN is not constructed Therefore, in the communication system 100, the wireless communication interface 212 of the printing apparatus 101 is substantially used as an interface for performing wireless communication using the Wi-Fi Direct.

In the printing apparatus 101, the connection to the external apparatus using the Wi-Fi Direct via the wireless communication interface 212 is given priority over the connection to the wired LAN 106 using the wired LAN interface 213. That is, the printing apparatus 101 shifts to the direct mode in response to a request from the external apparatus during connection to the wired LAN 106 using the wired LAN interface 213. When the direct mode is set in the printing apparatus 101, the connection to the wired LAN 106 using the wired LAN interface 213 is terminated, and when the direct mode of the printing apparatus 101 is terminated, the printing apparatus 101 returns to the infrastructure mode.

In the printing apparatus 101 of the present embodiment, it is assumed that a single CPU 202 performs processes, described hereinafter, using a single memory (RAM 203). However, this is not limitative, but the printing apparatus 101 may be configured such that a plurality of CPUs and a plurality of memories cooperate to perform the processes, described hereinafter.

Figure 3:
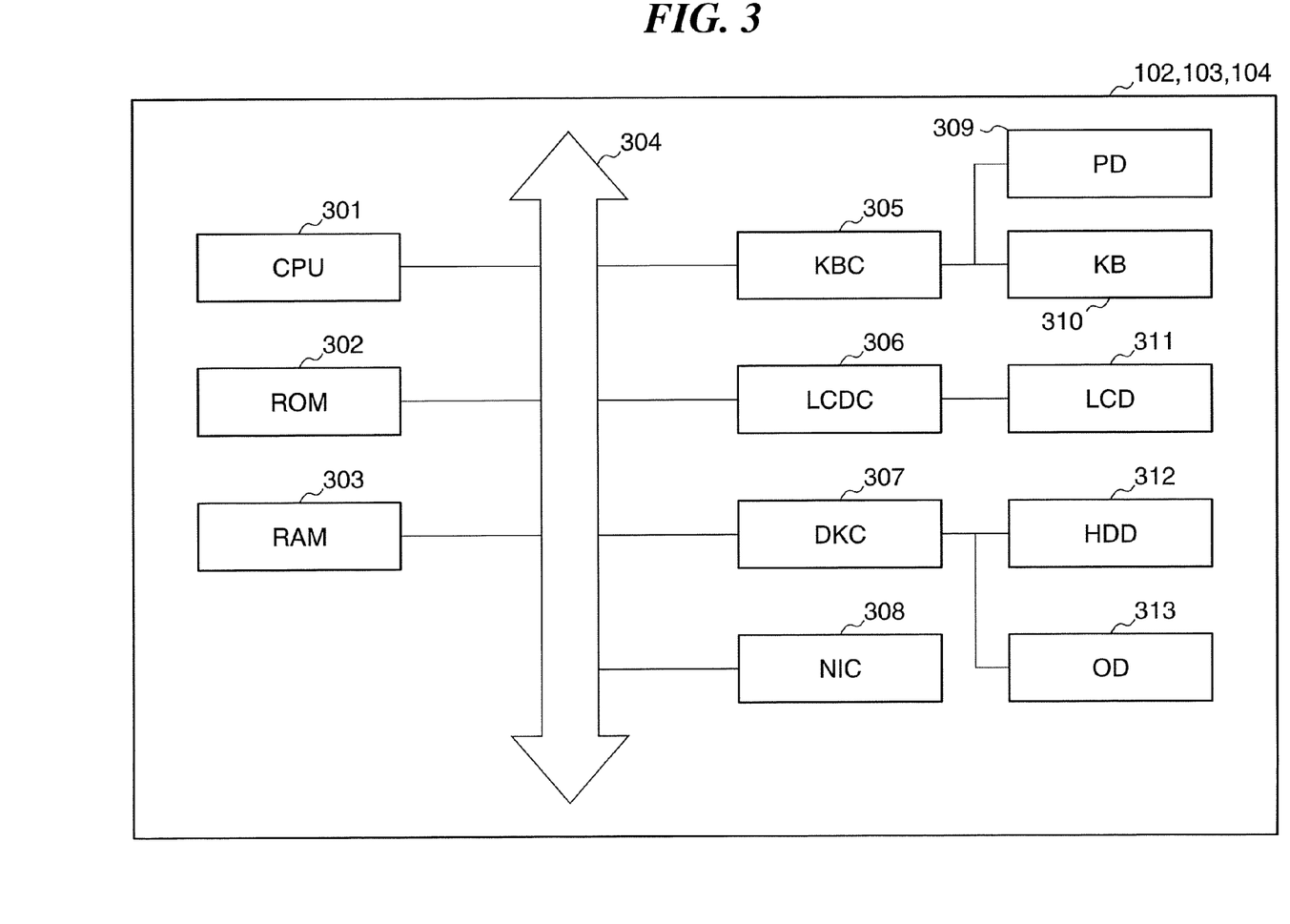
FIG. 3 is a block diagram of the common hardware configuration of a print server, a power management server, and a PC, which are included in the communication system shown in FIG. 1.

FIG. 3 is a block diagram of the common hardware configuration of the print server 102, the power management server 103, and the PC 104. Although the configuration illustrated in FIG. 3 is common to the print server 102, the power management server 103, and the PC 104, here, a description will be given of the print server 102, by way of example. Further, in this description, the hardware configuration of the print server 102 as a single apparatus will be described without limiting the state thereof to the state in which the print server 102 is connected to the wired LAN 106.

The print server 102 is comprised of a CPU 301, a ROM 302, a RAM 303, a system bus 304, a keyboard controller (KBC) 305, a display control section (LCDC) 306, a disk controller (DKC) 307, and a network interface card (NIC) 308.

The CPU 301 controls various devices connected to the system bus 304. The ROM 302 stores a BIOS (basic input output system) and a boot program, and so forth, and the RAM 303 is used as a main storage device of the CPU 301. A pointing device (PD) 309 and a keyboard (KB) 310 are connected to the keyboard controller 305. The keyboard controller 305 performs processing concerning input of information from the pointing device 309, such a mouse or a touch panel, and the keyboard 310.

The display control section 306, which has a video memory incorporated therein, renders image data in the video memory according to an instruction from the CPU 301, and outputs the image data rendered in the video memory as video signals to a display device 311, such as a liquid crystal display device (LCD). Note that the display device 311 is not limited to the liquid crystal display device, but any type of the display device 311, such as a CRT display, an organic EL (Electro Luminescence) display, may be used.

The disk controller 307 accesses a hard disk drive (HDD) 312 and an optical disk drive (OD) 313. The network interface card 308 is connected to the wired LAN 106, and performs information communication via the wired LAN 106. Note that the HDD 312 stores an OS (operating system) of the print server 102, various application programs operating on the OS, and so forth.

When the print server 102 is powered on, the CPU 301 starts and executes the boot program stored in the ROM 302, reads the OS from the HDD 312 to load it into the RAM 303, and thus functions as an information processing apparatus. The same applies to the power management server 103 and the PC 104.

Figure 4A:
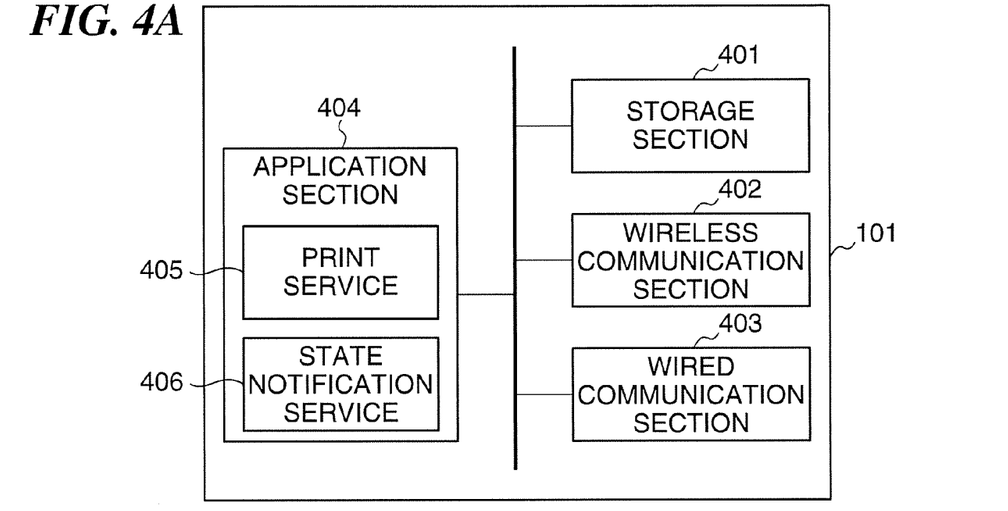
FIG. 4A is a diagram of the software configuration of the printing apparatus shown in FIG. 2.

FIG. 4A is a diagram of the software configuration of the printing apparatus 101. The printing apparatus 101 is comprised of a storage section 401, a wireless communication section 402, a wired communication section 403, and an application section 404. The application section 404 performs a print service 405 and a state notification service 406. The functions of the above respective sections are realized by the CPU 202 that executes control programs stored in the ROM 204 and the HDD 205.

Upon receipt of an instruction from another functional section, the storage section 401 stores data designated by the instruction in the RAM 203 or the HDD 205, or reads out data stored therein. The wireless communication section 402 controls wireless communication performed by the wireless communication interface 212. The wired communication section 403 controls communication performed by the wired LAN interface 213.

The print service 405 performed by the application section 404 inputs print data received via the wireless communication interface 212 or the wired LAN interface 213 to the printer section 207. The printer section 207 performs print processing based on the input print data. When an operating condition of the printing apparatus 101 is changed by powering on or off the apparatus or turning on or off the Wi-Fi Direct mode, the state notification service 406 transmits information of the change in the operating condition to an external apparatus connected to the network via the wireless communication interface 212 or the wired LAN interface 213. Note that the services provided by the application section 404 are not limited to the print service 405 and the state notification service 406, but it is also possible to provide other services.

Figure 4B:
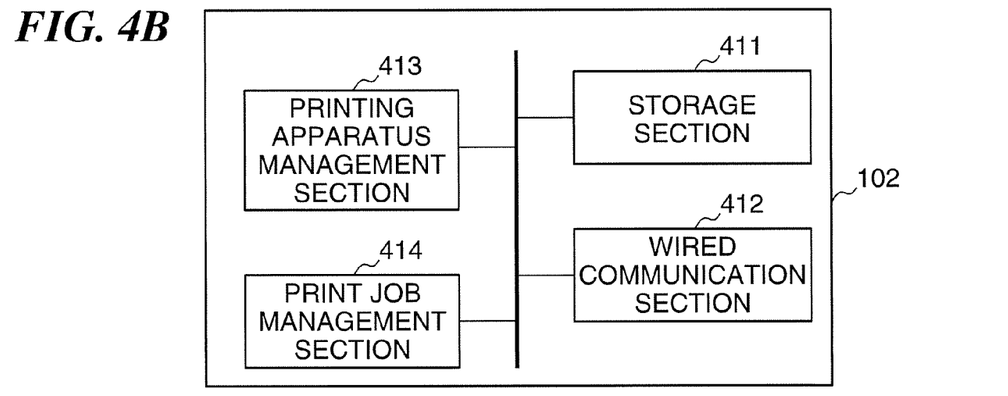
FIG. 4B is a diagram of the software configuration of the print server shown in the FIG. 3.

FIG. 4B is a diagram of the software configuration of the print server 102. The print server 102 is comprised of a storage section 411, a wired communication section 412, a printing apparatus management section 413, and a print job management section 414. The functions of the respective sections are realized by the CPU 301 that executes control programs stored in the ROM 302 and the HDD 312.

Upon receipt of an instruction from another functional section, the storage section 411 stores data designated by the instruction in the RAM 303 or the HDD 312, or reads out data stored therein. The wired communication section 412 controls communication performed by the network interface card 308. The printing apparatus management section 413 manages data of the printing apparatus 101. The print job management section 414 manages print jobs transmitted to the printing apparatus 101 which is managed by the printing apparatus management section 413.

Figure 4C:
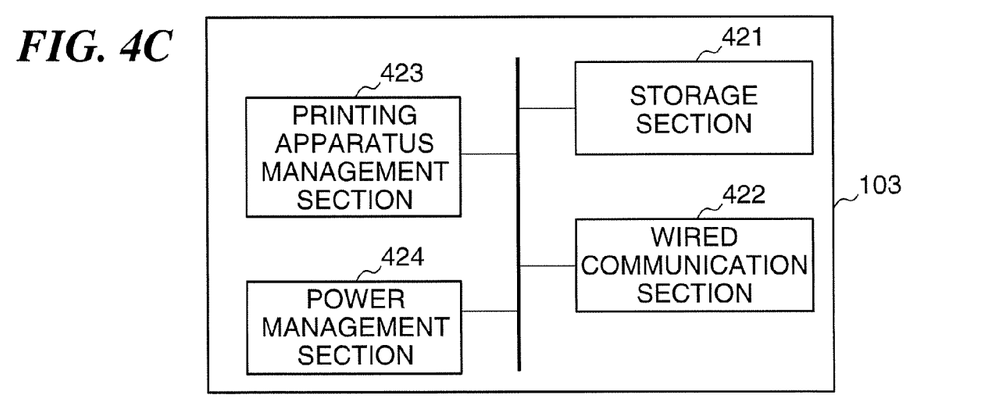
FIG. 4C is a diagram of the software configuration of the power management server shown in the FIG. 3.

FIG. 4C is a diagram of the software configuration of the power management server 103. The power management server 103 is comprised of a storage section 421, a wired communication section 422, a printing apparatus management section 423, and a power management section 424. The functions of the respective sections are realized by the CPU 301 that executes control programs stored in the ROM 302 and the HDD 312.

Upon receipt of an instruction from another functional section, the storage section 421 stores data designated by the instruction in the RAM 303 or the HDD 312, or reads out data stored therein. The wired communication section 422 controls communication performed by the network interface card 308. The printing apparatus management section 423 manages data of the printing apparatus 101. The power management section 424 manages the amount of power consumption of the printing apparatus 101 managed by the printing apparatus management section 423. Note that calculation of the amount of power consumption is performed by integrating time from power-on to power-off of the printing apparatus 101. The calculation of the amount of power consumption is not limited to the above method, and it may be performed based on the number of sheets printed or scanned by the printing apparatus 101.

Figure 5:
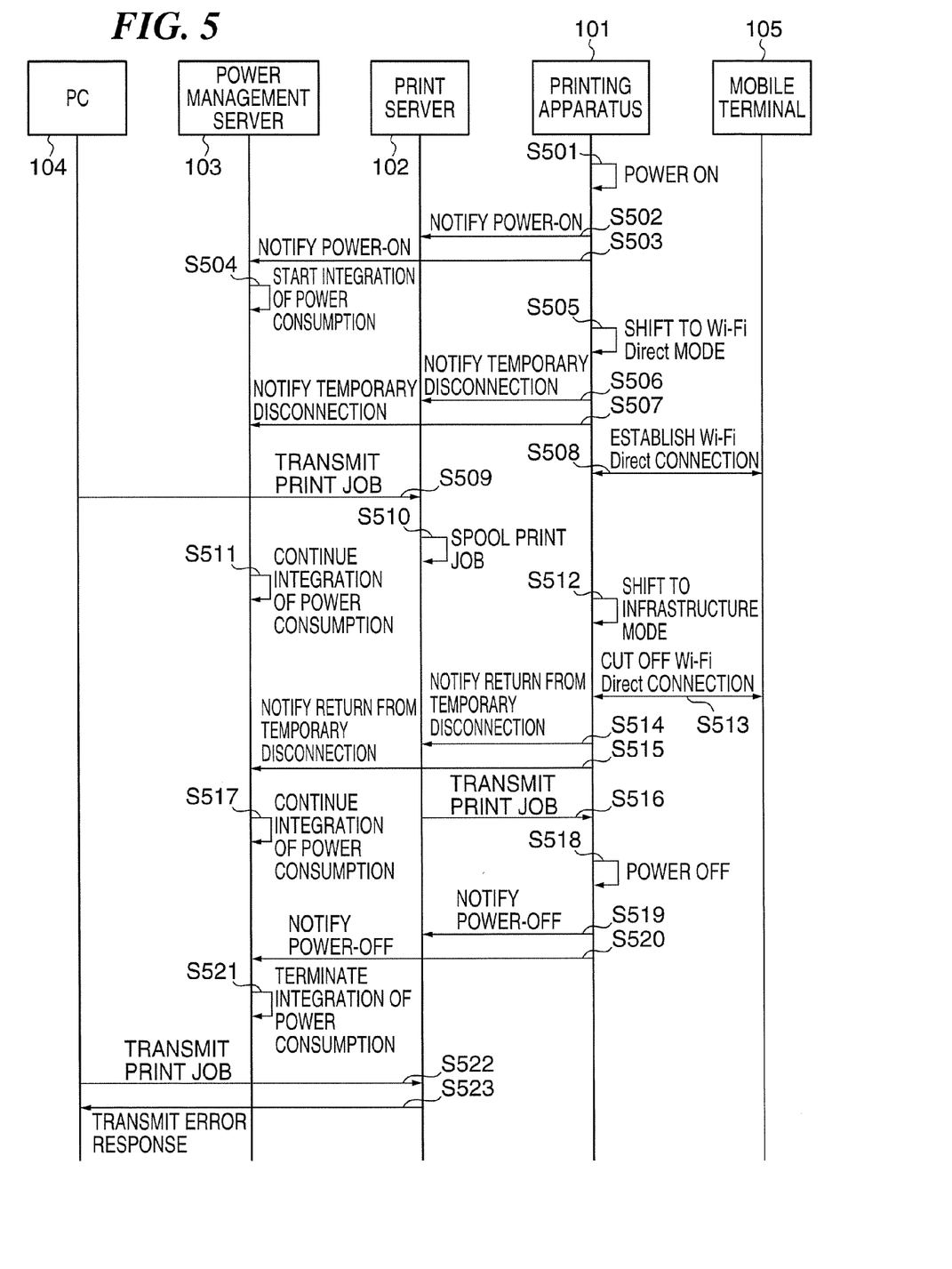
FIG. 5 is a diagram showing a state notification sequence of the communication system shown in FIG. 1.

FIG. 5 is a diagram showing a state notification sequence of the communication system 100. Programs for the state notification sequence of the printing apparatus 101 are stored in the ROM 204 and the HDD 205 of the printing apparatus 101. These programs are loaded into the RAM 203, and are executed by the CPU 202. Further, the programs for the print server 102, the power management server 103, and the PC 104 are respectively stored in the ROMs 302 and the HDDs 312 of the respective apparatuses. These programs are loaded into the RAM 303, and are executed by the CPU 301.

First, in a step S501, the printing apparatus 101 is powered on. In a step S502, the printing apparatus 101 notifies the print server 102 of power-on of the printing apparatus 101. Further, in a step S503, the printing apparatus 101 notifies the power management server 103 of the power-on of the printing apparatus 101. Upon receipt of the power-on notification, the power management server 103 starts calculating the integral power consumption (integration of the amount of power consumption) of the printing apparatus 101 in a step S504.

Next, in a step S505, the printing apparatus 101 shifts to the Wi-Fi Direct mode. Note that the shift of the printing apparatus 101 to the Wi-Fi Direct mode is performed upon receipt of a request of connection in the Wi-Fi Direct mode from the mobile terminal 105. Then, in a step S506, the printing apparatus 101 transmits to the print server 102 a temporary disconnection notification to the effect that the printing apparatus 101 temporarily disconnects from the wired LAN 106. Further, in a step S507, the printing apparatus 101 transmits the temporary disconnection notification to the power management server 103. Then, in a step S508, the printing apparatus 101 establishes Wi-Fi Direct connection to the mobile terminal 105.

In a step S509, the PC 104 transmits a print job to the print server 102. Upon receipt of the print job, in a step S510, the print server 102 spools the print job, since the print server 102 has recognized that the printing apparatus 101 has temporarily disconnected from the wired LAN 106. Further, in a step S511, the power management server 103 continues calculating the integral power consumption even after receiving the temporary disconnection notification from the printing apparatus 101.

In a step S512, the printing apparatus 101 shifts to the infrastructure mode. In the following step S513, the printing apparatus 101 cuts off the Wi-Fi Direct connection to the mobile terminal 105. Note that the printing apparatus 101 is caused to shift to the infrastructure mode by a notification of termination of the Wi-Fi Direct connection, which is transmitted from the mobile terminal 105.

After that, in a step S514, the printing apparatus 101 transmits to the print server 102 a notification of return from the temporary disconnection. Further, in a step S515, the printing apparatus 101 transmits the notification of return from the disconnection to the power management server 103. Note that in the step S515, the printing apparatus 101 may notify the power management server 103 of the number of sheets printed or scanned during the Wi-Fi Direct mode. In this case, the power management server 103 calculates the amount of power consumption based on the received number of printed or scanned sheets and calculates the integral power consumption.

In a step S516, the print server 102 transmits the print job spooled therein, to the printing apparatus 101. Further, in a step S517, the power management server 103 continues calculating the integral power consumption even after receiving the notification of return from the disconnection from the printing apparatus 101.

When the printing apparatus 101 is powered off in a step S518, the printing apparatus 101 transmits a power-off notification to the print server 102 in a step S519, and transmits the power-off notification to the power management server 103 in a step S520. In a step S521, the power management server 103 terminates calculating the integral power consumption of the printing apparatus 101. When the PC 104 transmits a print job to the print server 102 in a step S522, in a step S523, the print server 102 transmits an error response to the PC 104 without receiving the print job, since the print server 102 has recognized that the printing apparatus 101 is in a powered-off state.

Note that if the printing apparatus 101 is powered off between the steps S508 and S513, the print server 102 and the power management server 103 cannot receive the notification of return from the disconnection. To cope with this problem, the printing apparatus 101 may shift from the Wi-Fi Direct mode to the infrastructure mode before the apparatus is actually powered off such that the notification of return from the disconnection and the power-off notification can be sequentially transmitted in the mentioned order.

Figure 6:
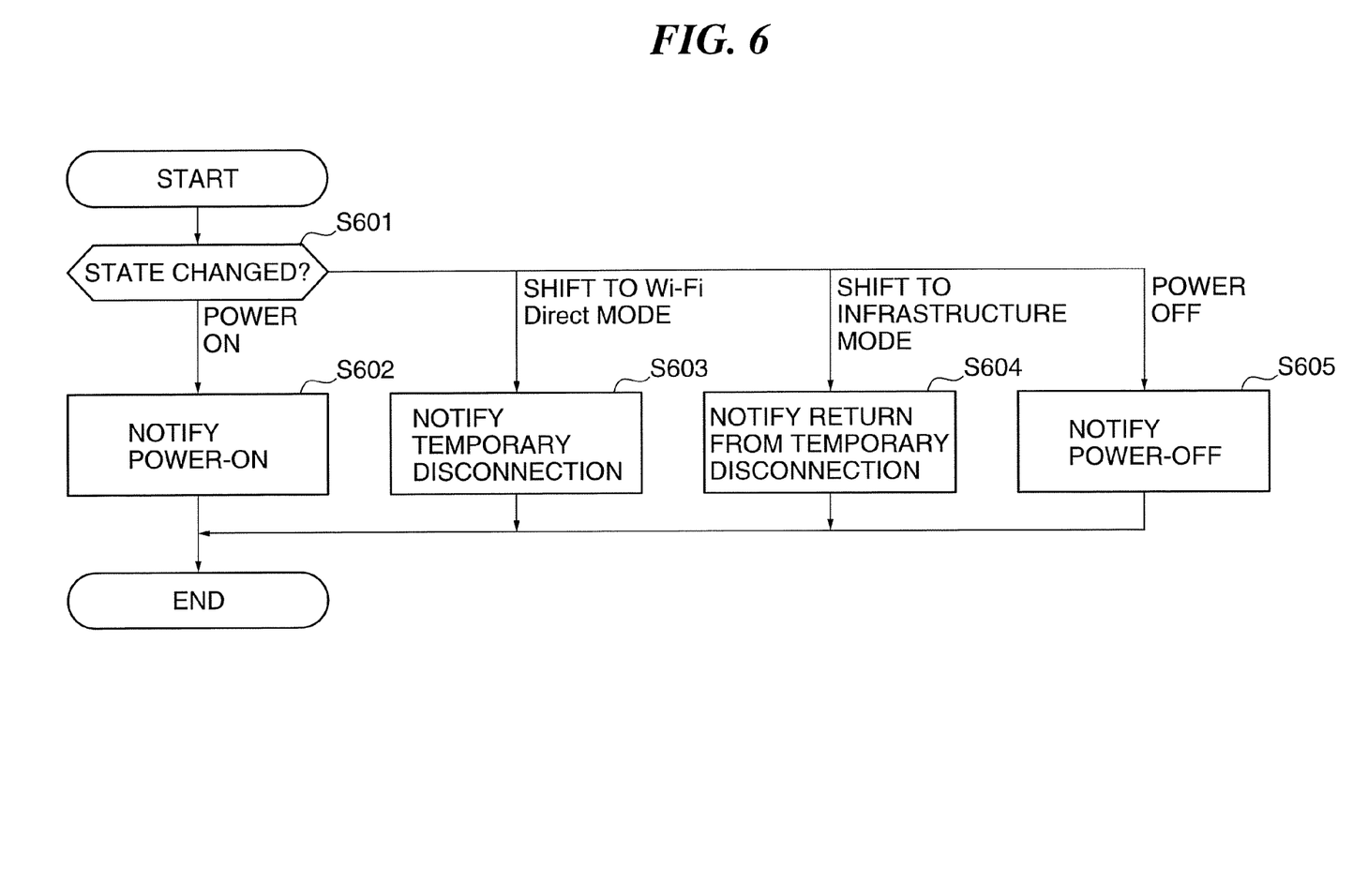
FIG. 6 is a flowchart of a process for a state notification service, which is performed by an application section of the printing apparatus shown in FIG. 4A.

FIG. 6 is a flowchart of a process for the state notification service 406, which is performed by the application section 404 of the printing apparatus 101. Each step in the FIG. 6 process is executed by the CPU 202 which loads a program stored e.g. in the ROM 204 into the RAM 203 and executes the program.

In the state notification service 406, in a step S601, it is determined whether or not the state of the printing apparatus 101 has been changed, and notification processing is performed according to a type of the change. That is, if it is determined that the printing apparatus 101 has been powered on, in a step S602, the power-on notification is transmitted from the wired communication section 403 to the print server 102 and the power management server 103 connected to the wired LAN 106. If it is determined that the printing apparatus 101 has shifted from the infrastructure mode to the Wi-Fi Direct mode, in a step S603, the temporary disconnection notification is transmitted from the wired communication section 403 to the print server 102 and the power management server 103.

Further, if it is determined that the printing apparatus 101 has shifted from the Wi-Fi Direct mode to the infrastructure mode, in a step S604, the notification of return from the disconnection is transmitted from the wired communication section 403 to the print server 102 and the power management server 103. If it is determined that the printing apparatus 101 has been powered off, in a step S605, the power-off notification is transmitted from the wired communication section 403 to the print server 102 and the power management server 103.

Figure 7:
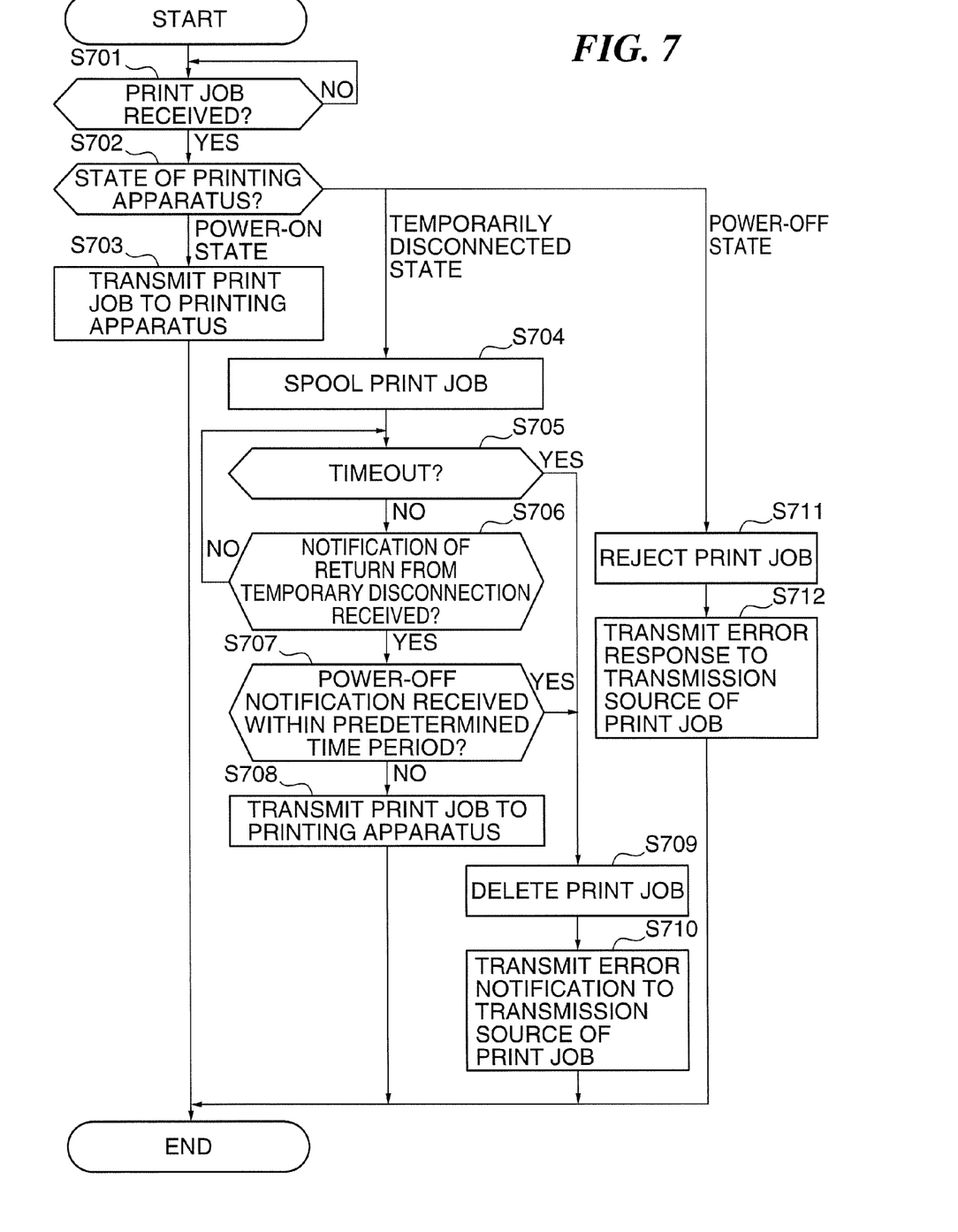
FIG. 7 is a flowchart of a print job control process performed by a print job management section of the print server shown in the FIG. 4B.

FIG. 7 is a flowchart of a print job control process performed by the print job management section 414 of the print server 102. Each step in the FIG. 7 process is performed by the CPU 301 which loads a program stored e.g. in the ROM 303 into the RAM 303 and executes the program.

The print job management section 414 determines in a step S701 whether or not a print job has been received via the wired communication section 412. In the communication system 100, print jobs are transmitted from the PC 104. The print job management section 414 waits (NO to the step S701) until a print job is received. If a print job is received (YES to the step S701), the process proceeds to a step S702. In the step S702, the print job management section 414 determines the state of the printing apparatus 101 using the printing apparatus management section 413.

When the print job management section 414 determines in the step S702 that the printing apparatus 101 is in a powered-on state (state in which the printing apparatus 101 is communicably connected to the print server 102 and the power management server 103 in the infrastructure mode), in a step S703, the print job management section 414 transmits the print job to the printing apparatus 101, followed by terminating the present process.

If the print job management section 414 determines in the step S702 that the printing apparatus 101 is in a state temporarily disconnected from the wired LAN 106, in a step S704, the print job management section 414 spools the print job in the storage section 411. Then, in a step S705, the print job management section 414 calculates a time period elapsed after the state of the printing apparatus 101 was changed into the state temporarily disconnected from the wired LAN 106, and determines whether or not the elapsed time period has reached a predetermined time period (whether or not timeout has occurred). If timeout has occurred (YES to the step S705), the process proceeds to a step S709, whereas if timeout has not occurred (NO to the step S705), the process proceeds to a step S706.

In the step S706, the print job management section 414 determines whether or not the notification of return from the disconnection has been received. If the notification of return from the disconnection has been received (YES to the step S706), the process proceeds to a step S707, whereas if the notification of return from the disconnection has not been received (NO to the step S706), the process returns to the step S705.

In a case where the printing apparatus 101 is powered off during temporary disconnection thereof, the printing apparatus 101 transmits the notification of return from the disconnection before power-off, and immediately thereafter transmits the power-off notification, to the print server 102, whereafter the printing apparatus 101 is powered off. In this case, even when the print job management section 414 transmits the spooled print job to the printing apparatus 101, the printing apparatus 101 cannot execute the print job. To cope with this, the print job management section 414 determines in the step S707 whether or not the power-off notification has been received within a predetermined time period after the notification of return from the disconnection was received. If the power-off notification has been received within the predetermined time period after the notification of return from the disconnection was received (YES to the step S707), the process proceeds to the step S709. On the other hand, if the power-off notification has not been received within the predetermined time period after the notification of return from the disconnection was received (NO to the step S707), the process proceeds to a step S708.

In the step S708, the print job management section 414 transmits the spooled print job to the printing apparatus 101. In the step S709, the print job management section 414 deletes the print job, and in the following step S710, transmits an error notification that the print job could not be transmitted, to a transmission source (PC 104) of the print job. After performing the step S708 or S710, the present process is terminated.

If the print job management section 414 determines in the step S702 that the printing apparatus 101 is in a powered-off state, in a step S711, the print job management section 414 rejects receipt of the print job. Then, in a step S712, the print job management section 414 transmits an error response indicating that the printing apparatus 101 has been disconnected from the wired LAN 106, back to the PC 104 as the transmission source of the print job. This terminates the present process.

Figure 8:
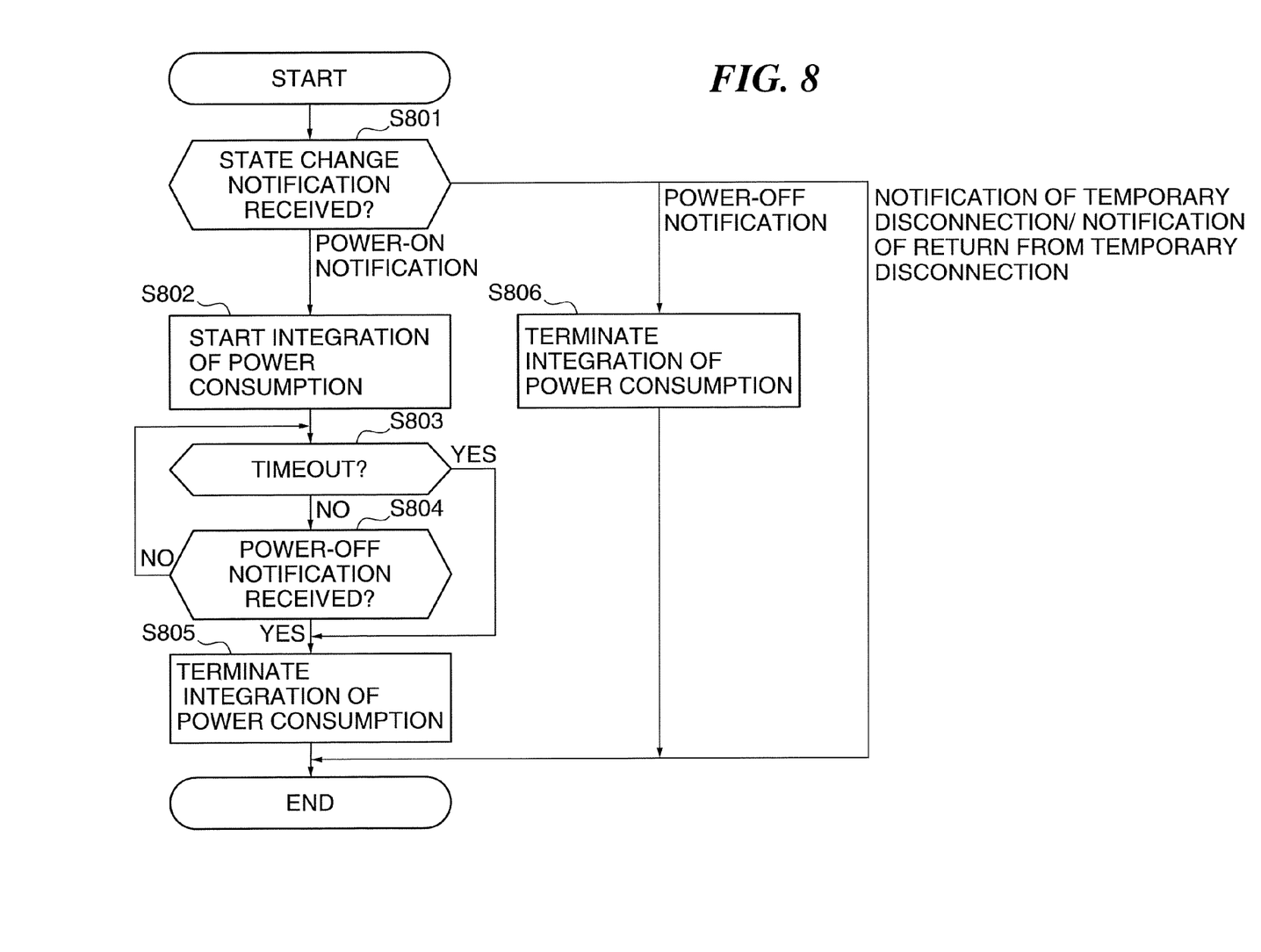
FIG. 8 is a flowchart of an integral power consumption calculation process performed by a power management section of the power management server shown in the FIG. 4C.

FIG. 8 is a flowchart of an integral power consumption calculation process performed by the power management section 424 of the power management server 103. Each step in the integral power consumption calculation process shown in FIG. 8 is executed by the CPU 301 which loads a program stored e.g. in the ROM 302 into the RAM 303 and executes the program.

In a step S801, the power management section 424 determines whether or not a state change notification has been received from the wired communication section 422, and performs processing according to the type of the change in the state of the printing apparatus 101. When the power-on notification has been received from the printing apparatus 101, in a step S802, the power management section 424 starts calculating the integral power consumption of the printing apparatus 101. In the following step S803, the power management section 424 calculates a time period elapsed after the printing apparatus 101 was powered on, and determines whether or not the elapsed time period has reached a predetermined time period (whether or not timeout has occurred).

If timeout has not occurred (NO to the step S803), the process proceeds to a step S804, whereas if timeout has occurred (YES to the step S803), the process proceeds to a step S805. Note that the configuration concerning the timeout may be such that the printing apparatus 101 is caused to periodically transmit a power-on-state notification indicating that the printing apparatus 101 is in the powered-on state to the power management server 103, and if the power management section 424 cannot receive the power-on-state notification for a predetermined time period, it determines occurrence of the timeout.

In the step S804, the power management section 424 determines whether or not the power-off notification has been received. If the power-off notification has not been received (NO to the step S804), the power management section 424 returns to the step S803, whereas if the power-off notification has been received (YES to the step S804), the process proceeds to the step S805. In the step S805, the power management section 424 terminates calculating the integral power consumption of the printing apparatus 101, followed by terminating the present process.

If it is determined in the step S801 that the power-off notification has been received from the printing apparatus 101, in a step S806, the power management section 424 terminates calculating the integral power consumption of the printing apparatus 101, followed by terminating the present process. Further, if it is determined in the step S801 that the temporary disconnection notification or the notification of return from the disconnection has been received, the present process is immediately terminated.

Note that the notification of return from the disconnection may include information for calculating power consumed during temporary disconnection, such as the number of sheets printed or scanned when the printing apparatus 101 was in the Wi-Fi Direct mode. In this case, the power management section 424 calculates the amount of power consumption based on the received number of printed or scanned sheets and calculates the integral power consumption.

As described heretofore, according to the present embodiment, it is possible to distinguish between disconnection from the wired LAN 106 caused by the power-off of the printing apparatus 101 and temporary disconnection from the wired LAN 106 caused by a change in the operation mode. Therefore, the print server 102 can spool a print job to the printing apparatus 101 even during a time period over which the printing apparatus 101 is in a state shifted from the infrastructure mode to the Wi-Fi Direct mode. As a consequence, the print server 102 is no longer required to transmit a job execution error to a transmission source of the print job whenever a print job is sent from the PC 104 or the like after the printing apparatus 101 has shifted to the Wi-Fi Direct mode, and an operator of a transmission source terminal which holds the print job is no longer required to transmit the print job many times. Further, the power management server 103 can continue calculating the integral power consumption of the printing apparatus 101 which is operating in a state having temporarily disconnected from the network. This enables accurate power management.

Although the present invention has been described based on the preferred embodiment, the present invention is not limited to the above-described embodiment, but it can be practiced in various forms, without departing from the spirit and scope thereof. Further, the above-described embodiments merely show one embodiment of the present invention, it is also possible to combine the above-described embodiments as appropriate.

For example, although in the above-described embodiment, the printing apparatus 101 and the mobile terminal 105 perform wireless communication using the Wi-Fi Direct, the present invention can be applied not only to the Wi-Fi Direct but also to any suitable wireless communication (standard) insofar as it enables communication apparatuses to directly communicate with each other.

Further, although in the above-described embodiment, the printing apparatus 101 has been described as an example of the communication apparatus which can communicate with external apparatuses, such as the PC 104 and the mobile terminal 105, this is not limitative, but the present invention can be applied to any suitable apparatus insofar as it has a communication function which can be performed by selectively switching between the infrastructure mode and the direct mode.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-247635 filed Nov. 29, 2013 which is hereby incorporated by reference herein in its entirety.

What is claimed is:

1. A printing system that includes a printing apparatus and a print server,
wherein the printing apparatus comprises:
a printing unit configured to perform print processing;
a wired communication unit configured to perform wired communication between the printing apparatus and the print server;
a wireless communication unit configured to perform directly wireless communication between the printing apparatus and a mobile terminal; and
a notification unit configured to notify the print server of predetermined information in a case where the printing apparatus has shifted from a first communication mode in which the wireless communication unit performs the directly wireless communication to a second communication mode in which the wired communication unit performs the wired communication, wherein in a case where the printing apparatus operates in the first communication mode, the printing apparatus is incapable of communicating with the print server, and
wherein the print server comprises:
a storing unit configured to store a print job; and
a transmission unit configured to transmit the print job stored by said storing unit to the printing apparatus in a case where the print server has received the predetermined information notified by said notification unit.

2. The printing system according to claim 1, wherein the predetermined information indicates that the printing apparatus has returned to a network via which the printing apparatus is capable of communicating with the print server.

3. The printing system according to claim 1, wherein in a case where the printing apparatus shifts from the second communication mode to the first communication mode, said notification unit notifies the print server of information indicating that the printing apparatus temporarily disconnects from a network via which the printing apparatus is capable of communicating with the print server, and
wherein in a case where the print server has received, from the printing apparatus, the information indicating that the printing apparatus temporarily disconnects from the network via which the printing apparatus is capable of communicating with the print server, the print server stores a print job to the printing apparatus in said storing unit.

4. The printing system according to claim 1, wherein in a case where the printing apparatus shifts from the second communication mode to the first communication mode, said notification unit notifies the print server of first information indicating that the printing apparatus temporarily disconnects from a network via which the printing apparatus is capable of communicating with the print server, and in a case where the printing apparatus is powered off, said notification unit notifies the print server of second information indicating that the printing apparatus is to be powered off, and
wherein in a case where the print server has received the first information from the printing apparatus, the print server stores a print job to the printing apparatus in said storing unit, and in a case where the print server has received the second information from the printing apparatus, the print server transmits an error notification to a transmission source of the print job.

5. The printing system according to claim 1, wherein the wireless communication unit performs the wireless communication based on Wi-Fi Direct.

6. A printing apparatus that is capable of communicating with a print server, comprising:
a printing unit configured to perform print processing;
a wired communication unit configured to perform wired communication between the printing apparatus and the print server;
a wireless communication unit configured to perform directly wireless communication between the printing apparatus and a mobile terminal;
a notification unit configured to notify the print server of predetermined information in a case where the printing apparatus has shifted from a first communication mode in which the wireless communication unit performs the directly wireless communication to a second communication mode in which the wired communication unit performs the wired communication, wherein in a case where the printing apparatus operates in the first communication mode, the printing apparatus is incapable of communicating with the print server; and
a reception unit configured to, after said notification unit has notified the print server of the predetermined information, receive a print job stored in the print server, from the print server.

7. The printing apparatus according to claim 6, wherein the predetermined information indicates that the printing apparatus has returned to a network via which the printing apparatus is capable of communicating with the print server.

8. The printing apparatus according to claim 6, wherein when the printing apparatus shifts from the second communication mode to the first communication mode, said notification unit notifies the print server of information indicating that the printing apparatus temporarily disconnects from a network via which the printing apparatus is capable of communicating with the print server.

9. The printing apparatus according to claim 8, wherein in a case where the printing apparatus is powered off, said notification unit further notifies the print server of information indicating that the printing apparatus is to be powered off.

10. The printing apparatus according to claim 6, wherein the wireless communication unit performs the wireless communication based on Wi-Fi Direct.

11. A method of controlling a printing apparatus that is capable of communicating with a print server, comprising:

notifying the print server of predetermined information in a case where the printing apparatus has shifted from a first communication mode in which the printing apparatus performs directly wireless communication between the printing apparatus and a mobile terminal to a second communication mode in which the printing apparatus performs wired communication between the printing apparatus and the print server, wherein in a case where the printing apparatus operates in the first communication mode, the printing apparatus is incapable of communicating with the print server;

receiving, in a case where said notifying notifies the print server of the predetermined information, a print job stored in the print server, from the print server; and performing print processing based on the print job.

12. A non-transitory computer-readable storage medium storing a computer-executable program for executing a method of controlling a printing apparatus that is capable of communicating with a print server, wherein the method comprises:

notifying the print server of predetermined information in a case where the printing apparatus has shifted from a first communication mode in which the printing apparatus performs directly wireless communication between the printing apparatus and a mobile terminal to a second communication mode in which the printing apparatus performs wired communication between the printing apparatus and the print server, wherein in a case where the printing apparatus operates in the first communication mode, the printing apparatus is incapable of communicating with the print server;

receiving, in a case where said notifying notifies the print server of the predetermined information, a print job stored in the print server, from the print server; and performing print processing based on the print job.

* * * * *